United States Patent Office 2,798,301
Patented July 9, 1957

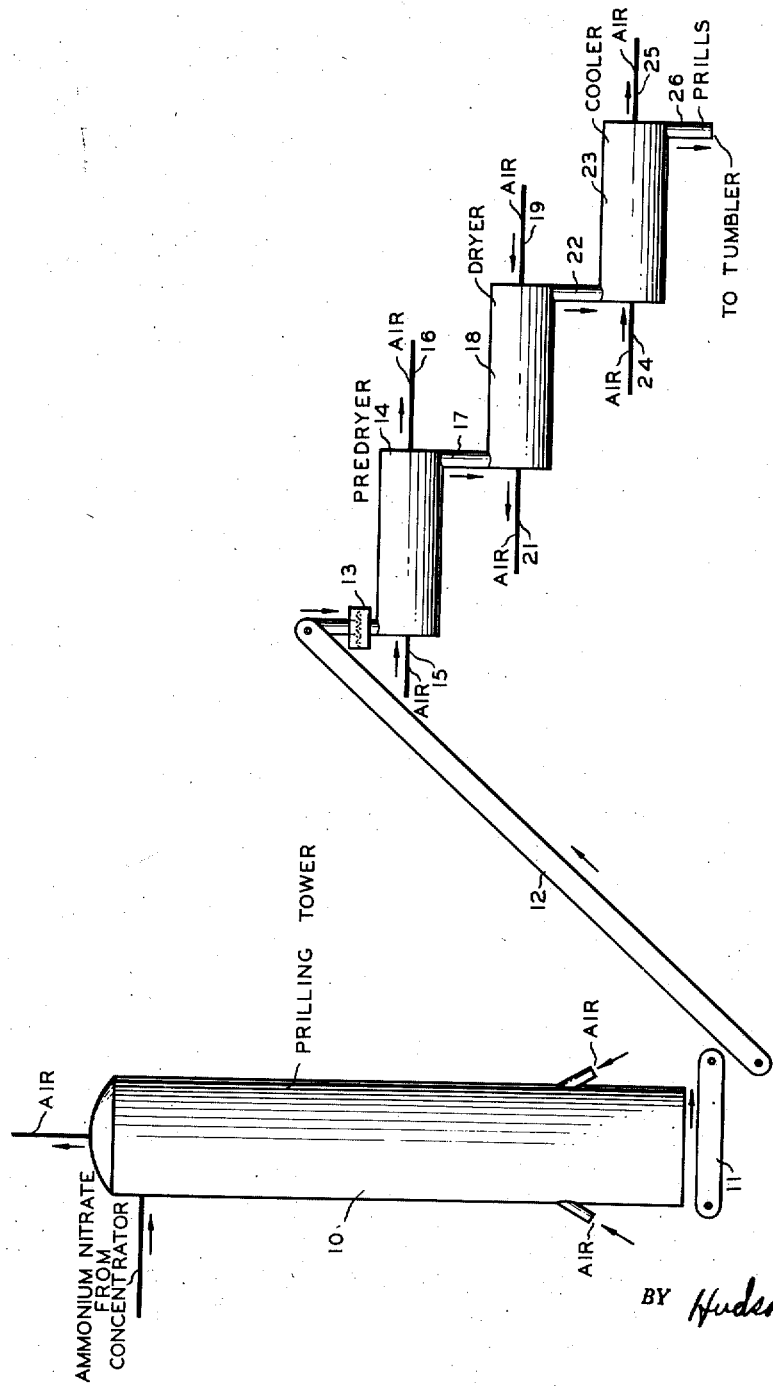

2,798,301
PROCESS FOR DRYING AMMONIUM NITRATE PRILLS

Herbert R. Antle, Stratford, Tex., assignor to Phillips Petroleum Company, a corporation of Delaware Application July 6, 1954, Serial No. 441,615

3 Claims. (Cl. 34—12)

This invention relates to a process for the production of prilled ammonium nitrate. In one of its more specific aspects, the invention relates to an improved process for drying ammonium nitrate. In another specific aspect it relates to a method for drying ammonium nitrate prills from the center to the outer surface so as to avoid entrapment of moisture within the prills.

Ammonium nitrate has rapidly advanced as a desirable fertilizer material because many soils are deficient in fixed nitrogen and ammonium nitrate represents a relatively easily prepared material which in the pure state contains 35 percent nitrogen and can be prepared to sell on a commercial scale with more that 33 percent nitrogen. Several methods have been proposed for the production of fertilizer grade ammonium nitrate but at present only two of these processes are in favor, namely, the so-called graining process and the so-called prilling process.

Ammonium nitrate has many peculiar properties which have not been completely understood and which have greatly influenced the development of methods for its manufacture. As examples, ammonium nitrate has been found to be highly explosive under, not entirely understood, circumstances. Ammonium nitrate is a hygroscopic material but the literature points out that not all forms of ammonium nitrate have the same degree of hygroscopicity. Various theories have been advanced pertaining to this seemingly unpredictable characteristic. Most of these theories have been based on the assumption that they are caused by the various crystal changes occurring in the ammonium nitrate at certain critical temperatures. Listed below are the polymorphic changes and transitional temperatures of ammonium nitrate as given in Mellor, A Comprehensive Treatise on Inorganic and Theoretical Chemistry, vol. 2, page 833.

| Phase | Crystalline Form | Transitional Temp., °C |
|---|---|---|
|  | liquid | 169.9. |
| I | cubic | 125.2. |
| II | tetragonal | 84.2. |
| III | monoclinic | 32.1. |
| IV | rhombic | −18. |
| V | tetragonal |  |

In the process of producing commercial ammonium nitrate in the prilled form, nitric acid (55 to 58 percent by weight) is reacted with vaporized ammonia. This produces a solution of ammonium nitrate of concentrations varying from 70 to 83 weight percent. The ammonium nitrate is concentrated to about 95 percent and pumped to the top of a prilling tower. Here the molten ammonium nitrate, containing from 4 to 6 weight percent moisture and which has been heated to about 130 to 150° C. and preferably to about 135 to 145° C., is sprayed into an ascending cooler air stream so that the streams of ammonium nitrate break up into many small spherical particles which solidify on falling through the countercurrent cool air to form spherical clusters of ammonium nitrate crystals which are known as prills in the art. The primary purpose of the prilling tower is to allow the prills to cool and harden sufficiently so that no distortion is caused when the prills are collected on a moving belt at the bottom of the tower. In falling through the tower the prills lose from 0.5 to 1.0 percent of the moisture present in the nitrate solution sprayed at the top of the tower. Thus the prills collected at the bottom of the tower have a moisture content of 3 to 5 percent and as the process is now generally practiced will be at a temperature below 84.2 C. which, from the crystal formation chart, will be recognized as the critical temperature for the transition from phase II to phase III crystal form. The prills are dried to reduce moisture content to 0.3 to 0.5 percent; coated with a parting agent, and bagged for shipment.

Prior processes have imposed an upper limit of 84° C. prill temperature during the drying process and for the prills leaving the tower. According to theory this mode of operation avoids crossing the critical transition temperature during the drying process which would cause the prills to break down, because of volume change in the individual crystals. In a typical commercial ammonium nitrate drying process, three stages are utilized, namely, a predrying stage, a drying stage, and a cooling stage. In theory the prills should enter the predryer with about 4 percent moisture. They should enter the dryer at 2.7 percent moisture. The should leave the dryer at about 0.5 percent moisture and the cooler at about 0.3 percent moisture. In actual prilling processes, however, the prills usually have a lower initial moisture, approximately 3.8 percent, and leave the predryer with about 2.3 percent moisture. They leave the dryer with about 1 percent moisture and the cooler with about 0.5 percent moisture. In order to achieve this drying rate, the prills enter the predryer at 70 to 80° C. and are contacted with air at approximately 65° C. so that the exit prills have a temperature of 70–75° C. These prills are contacted in the dryer with air at approximately 145° C. and leave the dryer at a temperature of 80–83° C. In the cooler the prills are treated with air at a temperature of 15–35° C. so that the dried product leaves the cooler at 45–50° C. Experiments show that with proper control of temperature, bed depths, and speed of rotation, the drying can be accomplished at a rate of approximately 0.1 weight percent moisture removal per foot of drying apparatus. It is a feature of this invention that according to my novel drying procedure the same equipment is capable of drying at the rate of 0.15 weight percent moisture removal per foot of drying apparatus.

Each of the following objects of the invention is attained by at least one of the aspects of the invention.

It is an object of this invention to provide an improved method for drying ammonium nitrate prills.

It is an object to produce ammonium nitrate prills having a lower moisture content than have been produced.

It is another object to provide a drying sequence which increases the rate of moisture removal from ammonium nitrate prills.

It is still another object to provide an improved method for drying ammonium nitrate prills so as to reduce the production of fines.

Other objects and advantages will be apparent to one skilled in the art upon reading the disclosure of this invention.

I have found that prilled ammonium nitrate can be produced at the bottom of the prilling tower at a temperature greater than 84.8° C. In my copending disclosure Serial No. 380,979, filed September 18, 1953, I have shown that these prills have important advantages over the prior art prills in being harder, more uniformly round, smoother surfaced, and denser than prior art prills. Accordingly, my improved drying method is not handicapped by being limited to 84° C. maximum prill temperature. Thus the prills can be produced at the bottom of the tower at a temperature in the range 70 to 100° C., the preferred range being in the range 70 to 90° C.

The moisture remaining in the prills is not superficial, easily removed moisture of a characteristic wet substance but is internally confined moisture whose rate of removal is limited by the vapor pressure of water from a highly concentrated ammonium nitrate solution and the permeability of the prill.

The drying of ammonium nitrate prills is not to be confused with drying solid materials such as clay because clay is not water soluble and the moisture to be removed from clay is free water whereas drying ammonium nitrate requires evaporating moisture from a mixture of ammonium nitrate crystals and a saturated solution of ammonium nitrate. This drying must be done in such manner that additional ammonium nitrate crystals formed by the evaporation of moisture does not block the spaces between already formed crystals and prevent escape of moisture. Thus drying must be conducted from the center of the prill to the surface if effective drying is to be accomplished. A uniform rate of drying throughout the cross-section of the prill cannot accomplish complete drying because of the deposition of crystals from the evaporating solution.

I have discovered an improved method for drying ammonium nitrate prills which comprises progressively raising the temperature of the prills in the predryer and dryer while maintaining the humidity such that the surface of the prills is maintained moist. Thus the prills are dried from the inside to the outside. In the cooler the prills are cooled from the outside to the inside so that the temperature drives the moisture outwardly in all three steps.

Thus according to the process of my invention prills are recovered from the bottom of the prilling tower, passed to a predryer wherein the temperature is raised in a humid atmosphere so as to set up a mositure drive from the center of the prill to the atmosphere while maintaining the surface of the prills moist. The temperature of the prills in the dryer is again raised in an atmosphere of sufficiently low humidity so as to remove moisture from the surface of the prills at substantially the rate at which it accumulates. The prills are then cooled to slightly above atmospheric temperature in the cooler in an atmosphere of sufficiently low humidity so as to continue to remove moisture driven to the surface by the hotter interior.

My invention differs from prior art drying procedure which cools the prills in the predryer stage, does all heating of the prills in the dryer stage, and cools in the cooler stage, in that I strive to initiate and maintain a sphere of drying in the core of the prill which progressively moves outward toward the periphery of the prill during the heating stages of my drying process as a result of the growth of a crystalline mass at the core of the prill so that the remaining moisture will have sufficient time and opportunity to evaporate from the surface during the cooling stage. Thus, the core of the prill is believed to be about as dry as it will be in the final product, upon leaving the predryer and moisture is removed from the periphery of the prill in the dryer and cooler.

It should be obvious that several factors, not directly related to the drying, would influence the attainment of this goal. One of these factors, distribution of prill size, has a very high influence and throughout the process I endeavor to produce a minimum of prills of large diameter and where these prills are unavoidably produced in the prilling tower, they will be removed before the prills enter the predryer. Usually from 95 to 98 percent of prills will pass an 8 mesh screen and be retained on a 100 mesh screen. Material passing a 100 mesh screen will be removed by the air stream. My improved process reduces the production of fines in the drying operation which is proportional to the rate of rotation of the drying apparatus and also proportional to the residence time. These two factors are interrelated because in reducing the residence time I have automatically reduced the number of revolutions of the drying apparatus to which the prills are subjected.

Accordingly, it is a feature of this invention that the production of fines is reduced in a process for the production of ammonium nitrate prills.

I have found that drying the prills from the center to the surface is favorably influenced by maintaining the moisture content of the air utilized in the predryer stage at a high relative value. Thus, by employing air with relative humidity in the range 70–90 percent when measured at 35 to 38° C., the evaporation of moisture from the surface of the prills in the predryer is controlled by the rate of evaporation of moisture from the core of the prill to the surface. In order to encourage the expansion of the sphere of evaporation, the prill temperature is raised in range 1 to 15° C., preferably 1 to 5° C. during the predrying stage. The prills entering the dryer will thus have a faster rate of moisture transfer to the surface because the moisture now has a shorter path to follow because drying is believed to be substantially completed at the core and the remaining moisture is near the surface. Accordingly, the air to the dryer can have a lower relative humidity when measured at 35 to 38° C. (less than 60 R. H.) and still remove moisture from the surface of the prill at approximately the rate at which it reaches the surface. In order to maintain the proper rates, the prill temperature is raised in the range 1 to 15° C. and preferably 1 to 5° C. during the dryer stage. Thus it will be seen that a unidirectional temperature gradient has been maintained throughout the heating stages of the drying process. By operating in this manner the sphere of evaporation will have moved to a position close to the periphery of the prills where residual moisture will readily be removed by the low-moisture-content, cool air utilized in the cooling stage. The air to the cooler will have a relative humidity at its entering temperature of less than 60 percent.

The accompanying drawing is a schematic flow diagram of a preferred embodiment of my invention.

Referring now to the drawing, prills are removed from the bottom of the prilling tower 10 and conveyed by conveyor means 11 and 12 to screens 13 and to predryer 14. The conveyor means 11 and 12 can be a series of belts, screw conveyors, chutes, elevators, or other conveyances. Ordinarily it will be found convenient to elevate the prills to the predryer and utilize gravity flow and chutes for transportation of the prills through the drying stages although it is also possible to gravitate the prills directly from the bottom of the prilling tower through the drying steps and then elevate them to the desired level. Predryer air enters by way of conduit 15 and leaves by way of conduit 16. The prills leaving predryer 14 by way of conveyor 17 enter dryer 18. The dryer air enters by way of conduit 19 and leaves by way of conduit 21. The prills leave the dryer 18 and are transported from dryer 18 by way of conveyor 22 to cooler 23. The cooler air enters by way of conduit 24 and leaves by way of conduit 25. The prills exit the cooler by way of conveyor 26. The dried prills are mixed with clay, tumbled, and bagged according to conventional methods practiced by the art to conclude the preparation of a product having a nitrogen content of 33+ percent and with a moisture content less than 0.5 percent.

The air leaving the drying steps through conduits 16, 21, and 25 entrains some ammonium nitrate fines and accordingly scrubbers (not shown) are provided for the recovery of this material, the scrubber liquor being returned to the concentrator (not shown).

In one plant, which is operated according to the prior art process for the drying of ammonium nitrate prills, an equivalent product to the above is usually prepared but the production is limited to approximately 300 tons per day by the drying equipment. In this plant 25 minutes residence time is required in each of the drying stages. According to my invention 10 minutes residence time in each drying stage is sufficient. Thus 490 tons per day can be processed in this plant by practicing the method of my invention. Residence time can be increased by reducing the bed depth or by shortening the length of the drying stages.

A specific example of the operation of my improved drying process is as follows: A 95 weight percent ammonium nitrate solution is sprayed into the top of a prilling tower at a temperature of about 135 to 145° C. Air is passed upwardly through the prilling tower so as to reduce the temperature of the falling prills produced therein so that they reach the bottom of the prilling tower at a temperature in the range 70 to 100° C. The prills are removed from the bottom of the prilling tower and conveyed by a belt conveyor to the predryer. The prills enter the predryer having a moisture content of 3 to 5 weight percent and at a temperature in the range 60 to 90° C. having been cooled somewhat in transit from the bottom of the prilling tower. Predryer air is passed through the predryer at a temperature in the range 75 to 140° C. and at a relative humidity of 70 to 90 percent measured at 35 to 38° C. The prills leave the predryer having a moisture content of 1.3 to 2.5 weight percent and at a temperature of 61 to 95° C. Air is passed through the dryer at a temperature in the range of 90 to 150° C. and a relative humidity of from 35 to 60 percent when measured at 35 to 38° C. The prills leave the dryer with a moisture content of 0.5 to 0.6 weight percent and at a temperature of 62 to 96° C. The prills are passed from the dryer to the cooler and air is passed through the cooler at a temperature in the range of 15 to 35° C. and at a relative humidity measured at its entrance temperature of less than 50 percent for the lower temperature and less than 40 percent for the higher temperature, for example, 35 percent at 34° C. The prills leave the cooler at a temperature in the range 45 to 50° C. and contain 0.3 to 0.5 weight percent moisture. The dried prills, after being mixed with clay and bagged for shipment, have a moisture content of less than 0.5 percent.

As a further example of how my improved drying process operates, several runs have been completed utilizing an 8 foot Roto-Louvre dryer, revolving at 5 R. P. M., and at 600 pounds per hour feed rate. These runs show the effect of varying the relative humidity on drying rates in the predryer. The results and conditions of the runs are summarized in the following table.

*Comparative drying runs*

| C. F. M. Air Measured | Air Inlet Temp., °C. | Air Exit, °C. | Moisture Inlet Dry Basis, percent | Moisture Exit, percent | Temp. Material Inlet, °C. | Temp. Material Exit, °C. |
|---|---|---|---|---|---|---|
| 680 at 36° C., 30% RH [1] | 106 | 84 | 3.7 | 2.8 | 70 | 84 |
| 680 at 36° C., 70% RH | 106 | 87 | 3.8 | 2.5 | 70 | 85 |
| 680 at 36° C., 30% RH | 106 | 86 | 3.7 | 2.7 | 72 | 85 |
| 680 at 36° C., 70% RH | 108 | 88 | 3.7 | 2.5 | 70 | 86 |
| 706 at 24° C., 30% RH | 102 | 80 | 3.4 | 2.7 | 69 | 81 |
| 706 at 24° C., 80% RH | 102 | 82 | 3.4 | 2.3 | 82 | 88 |
| 865 at 35° C., 60% RH | 101 | 80 | 3.6 | 2.9 | 80 | 86 |
| 865 at 35° C., 70% RH | 104 | 80 | 3.9 | 2.6 | 70 | 85 |

Feed rate 600 pounds/hour.
[1] Relative humidity at the measured temperature.

The prill temperature as used in the specification and claims means the average temperature of the prills as measured by immersing a thermometer into the center of a mass of prills.

I have disclosed the theory according to which I believe my process accomplishes the desired result, however, I do not intend to be bound by such theory but only by the claims to the invention.

While I have described the process wherein the predryer air is passed concurrently with the prills it is also possible to operate the process of my invention with countercurrent flow of air in the predryer.

Variations and modificaions are possible within the scope of the disclosure of the invention, the essence of which is an improved method of drying ammonium nitrate prills which causes drying to progress from the core of the prill to the surface of the prill.

What is claimed is:

1. In the production of ammonium nitrate prills wherein molten ammonium nitrate, containing about 5 weight percent water, is sprayed into the top of a prilling tower countercurrent to a flow of cooling gas the improvement which comprises collecting the prills at the bottom of the prilling tower at a temperature in the range 70 to 100° C.; passing the prills at a temperature in the range 60 to 90° C. through a predrying zone; passing air through said predrying zone, said air having a relative humidity of 70 to 90 percent at 35 to 38° C. and a temperature sufficient to raise the temperature of the prills from about 1° C. to about 5° C.; passing said prills through a drying zone; passing air through said drying zone, said air having a relative humidity of less than 60 percent at 35 to 38° C. and a temperature sufficient to raise the temperature of the prills from about 1° C. to about 5° C.; passing said prills through a cooling zone; passing air through said cooling zone; said air having a relative humidity of less than 60 percent at the entrance temperature and at a temperature sufficient to lower the temperature of the prills to about 45–50° C.; and recovering resulting dried prills.

2. A process for the production of ammonium nitrate prills which comprises spraying molten ammonium nitrate containing from 4 to 6 weight percent moisture into the upper portion of a prilling tower at a temperature in the range 135 to 145° C.; passing air upwardly through said tower so as to cool the falling ammonium nitrate prills to a temperature in the range of 70 to 100° C. by the time they reach the bottom of the tower; passing prills recovered from the bottom of said tower and having a screen size of 8 to 100 to a predrying zone at a temperature in the range 60 to 90° C.; contacting said prills in said predrying zone with air at a temperature in the range 75 to 140° C. and at a relative humidity of 70 to 90 percent when measured at 35 to 38° C. for a time sufficient to raise the temperature of said prills from about 1 to 15° C.; passing said prills to a drying zone with air at a temperature in the range 90 to 150° C. and at a relative humidity of less than 60 percent when measured at 35 to 38° C. for a time sufficient to raise the temperature of said prills from about 1 to 15° C.; passing said prills to a cooling zone; contacting said prills in said cooling zone with air at a temperature in the range 15 to 35° C. and at a relative humidity of less than 60 percent when measured at 15° C. and less than 40 percent when measured at 35° C.; and recovering dried prills from said cooling zone.

3. In the production of ammonium nitrate prills wherein molten ammonium nitrate, containing about 3 to 6 weight percent water, is sprayed into the top of a prilling tower countercurrent to a flow of cooling gas, the improvement which comprises collecting the prills at the bottom of the prilling tower at a temperature in the range of about 70 to 100° C.; passing the prills at a temperature in the range of 60 to 90° C. through a pre-drying zone; passing air through said pre-drying zone, said air having a relatively humidity of 70 to 90 percent at 35 to 38° C. and a temperature sufficient to raise the temperature of the prills from about 1° C. to about 15° C.; passing said prills through a drying zone; passing air through said drying zone, said air having a relative humidity of less than 60 percent at 35 to 38° C. and a temperature sufficient to raise the temperature of the prills from about 1° C. to about 15° C.; passing said prills through a cooling zone; passing air through said cooling zone; said air having a relative humidity of less than 60 percent at the entrance temperature and at a temperature sufficient to lower the temperature of the prills to about 45 to 50° C.; and recovering resulting dried prills.

References Cited in the file of this patent

UNITED STATES PATENTS

| | | |
|---|---|---|
| 2,402,192 | Williams et al. | June 18, 1946 |
| 2,528,407 | Yeandle | Oct. 21, 1950 |
| 2,653,391 | Edmunds | Sept. 29, 1953 |

OTHER REFERENCES

Drying and Processing of Materials by Means of Conditioned Air, copyright 1929, Carrier Engineering Corp., Newark, New Jersey, pages 54 to 58 relied on.

UNITED STATES PATENT OFFICE

CERTIFICATE OF CORRECTION

Patent No. 2,798,301                                              July 9, 1957

Herbert R. Antle

It is hereby certified that error appears in the printed specification of the above numbered patent requiring correction and that the said Letters Patent should read as corrected below.

Column 1, line 27, for "that" read -- than --; column 2, line 66, for "84.8° C." read -- 84.2° C. --; column 6, line 55, after "zone" insert -- ; contacting said prills in said drying zone --; line 74, for "relatively" read -- relative --; column 8, lines 4 and 5, list of references cited, under "UNITED STATES PATENTS", for 2,528,407     Yeandle---------- Oct. 21, 1950
         2,653,391     Edmunds --------Sept. 29, 1953
                        read 2,528,407     Yeandle --------- Oct. 31, 1950
         2,653,391     Edmunds, Jr. -- Sept. 29, 1953

Signed and sealed this 19th day of November 1957.

(SEAL)
Attest:

KARL H. AXLINE
Attesting Officer

ROBERT C. WATSON
Commissioner of Patents